US011259245B2

(12) United States Patent
Pandey et al.

(10) Patent No.: US 11,259,245 B2
(45) Date of Patent: Feb. 22, 2022

(54) METHOD AND APPARATUS FOR POWER MANAGEMENT OF ELECTRONIC DEVICE

(71) Applicants: Samsung Electronics Co., Ltd., Suwon-si (KR); Delhi Technological University, Delhi (IN)

(72) Inventors: Nirmal Pandey, Noida (IN); Taranpreet Kaur, Ambala (IN); Nirav Patel, Gujarat (IN); Sachin Papneja, Ghazibad (IN); Braj Raj Singh, Sagar (IN); Ravindra Jain, Noida (IN); Dalbir Singh Dhilon, Chandigarh (IN); Manish Jindal, Ludhiana (IN); Nitin Barthwal, Delhi (IN); Pankaj Kodan, Ghaziabad (IN); Om Prakash Verma, Delhi (IN); Amioy Kumar, Delhi (IN)

(73) Assignees: Samsung Electronics Co., Ltd., Suwon-si (KR); Delhi Technological University (DTU), Delhi (IN)

(*) Notice: Subject to any disclaimer, the term of this patent is extended or adjusted under 35 U.S.C. 154(b) by 53 days.

(21) Appl. No.: 16/622,124

(22) PCT Filed: Aug. 16, 2018

(86) PCT No.: PCT/KR2018/009407
§ 371 (c)(1),
(2) Date: Dec. 12, 2019

(87) PCT Pub. No.: WO2019/035665
PCT Pub. Date: Feb. 21, 2019

(65) Prior Publication Data
US 2021/0153124 A1 May 20, 2021

(30) Foreign Application Priority Data
Aug. 18, 2017 (IN) .............................. 201711029352

(51) Int. Cl.
*H04W 52/02* (2009.01)
(52) U.S. Cl.
CPC ..... *H04W 52/0235* (2013.01); *H04W 52/027* (2013.01); *H04W 52/028* (2013.01); *H04W 52/0251* (2013.01)
(58) Field of Classification Search
CPC ........... H04W 52/0258; H04W 52/028; H04W 52/02; H04W 52/0203; Y02D 30/70
(Continued)

(56) References Cited

U.S. PATENT DOCUMENTS 8,214,164 B2   7/2012  Gandhi et al.
8,385,986 B2   2/2013  Kim
(Continued)

FOREIGN PATENT DOCUMENTS

EP       2 523 431 A1      11/2012
EP       2 605 489 B1       3/2016
KR    10-2011-0016586 A     2/2011

OTHER PUBLICATIONS

Ndian Office Action dated Apr. 23, 2020; Indian Appln. No. 201711029352.

*Primary Examiner* — Robert J Lopata
(74) *Attorney, Agent, or Firm* — Jefferson IP Law, LLP

(57) ABSTRACT

The present disclosure relates to a method for power management of an electronic device, the method comprising determining an onset of a predefined time segment corresponding to a time period; obtaining power consumption data by monitoring at least one of a current power consumption rate, a current device state, and a current device usage pattern of the device during the predefined time segment; selecting a power consumption category for the predefined time segment based on the power consumption data; switching from a first power saving mode active on the device to a second power saving mode based on the selected power (Continued)

consumption category; and performing one or more operations on the device based on the second power saving mode.

15 Claims, 9 Drawing Sheets

(58) Field of Classification Search
USPC .......................................................... 370/311
See application file for complete search history.

(56) References Cited

U.S. PATENT DOCUMENTS

| | | | |
|---|---|---|---|
| 9,069,047 B2 | 6/2015 | Nallabelli et al. | |
| 9,338,749 B2 | 5/2016 | Kim | |
| 9,488,695 B2 | 11/2016 | Simeth | |
| 10,785,721 B1* | 9/2020 | Bontempi | H04W 4/24 |
| 2007/0164708 A1* | 7/2007 | Jiang | H01M 10/425 |
| | | | 320/132 |
| 2010/0056230 A1* | 3/2010 | Chan | H04W 52/0264 |
| | | | 455/574 |
| 2011/0080422 A1* | 4/2011 | Lee | G06F 1/3203 |
| | | | 345/589 |
| 2014/0181552 A1 | 6/2014 | Andreoli et al. | |
| 2015/0116364 A1* | 4/2015 | Aurongzeb | G06F 1/3265 |
| | | | 345/659 |
| 2015/0301582 A1 | 10/2015 | Pan | |
| 2016/0073351 A1 | 3/2016 | Cardozo et al. | |
| 2016/0239069 A1* | 8/2016 | Um | G06F 1/3231 |
| 2017/0329382 A1* | 11/2017 | Guo | G06F 1/3203 |
| 2017/0351310 A1* | 12/2017 | Pathak | G06F 1/3287 |
| 2017/0373522 A1* | 12/2017 | Pelosi | H02J 7/0027 |
| 2019/0163250 A1* | 5/2019 | Lee | G06F 11/3062 |
| 2019/0258305 A1* | 8/2019 | Marchiori | G06F 16/1737 |
| 2020/0260376 A1* | 8/2020 | Islam | H04W 52/0212 |

* cited by examiner

[Fig. 1A]
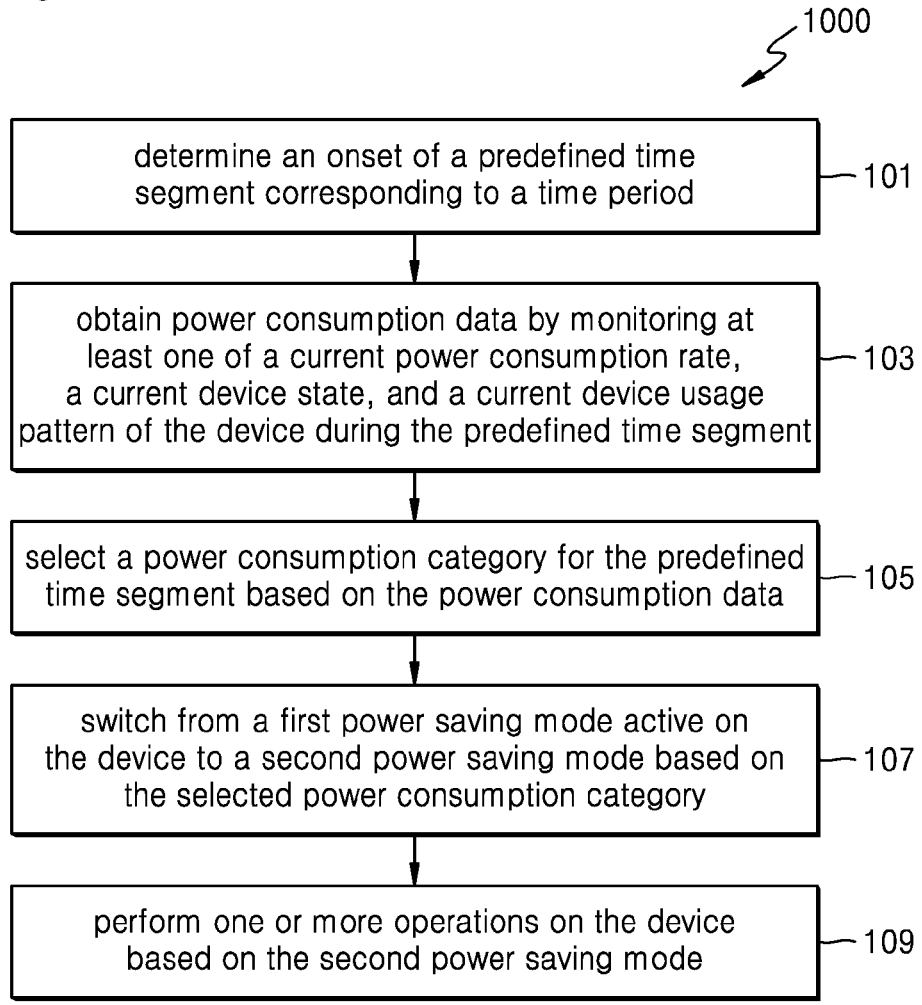
[Fig. 1B]
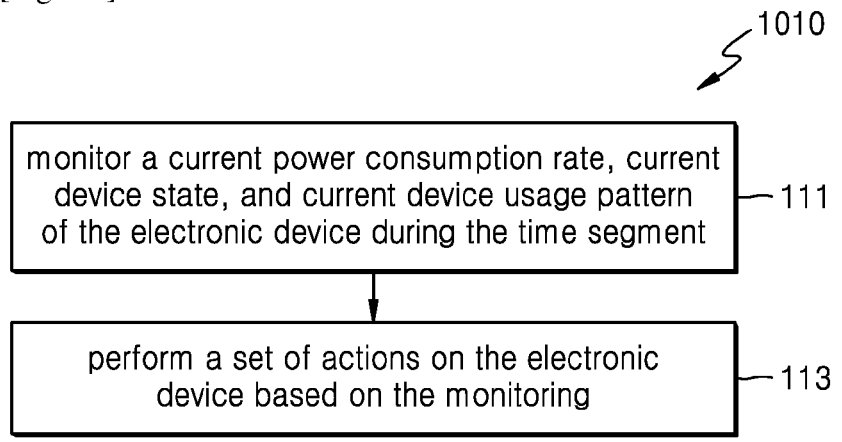

[Fig. 1C]
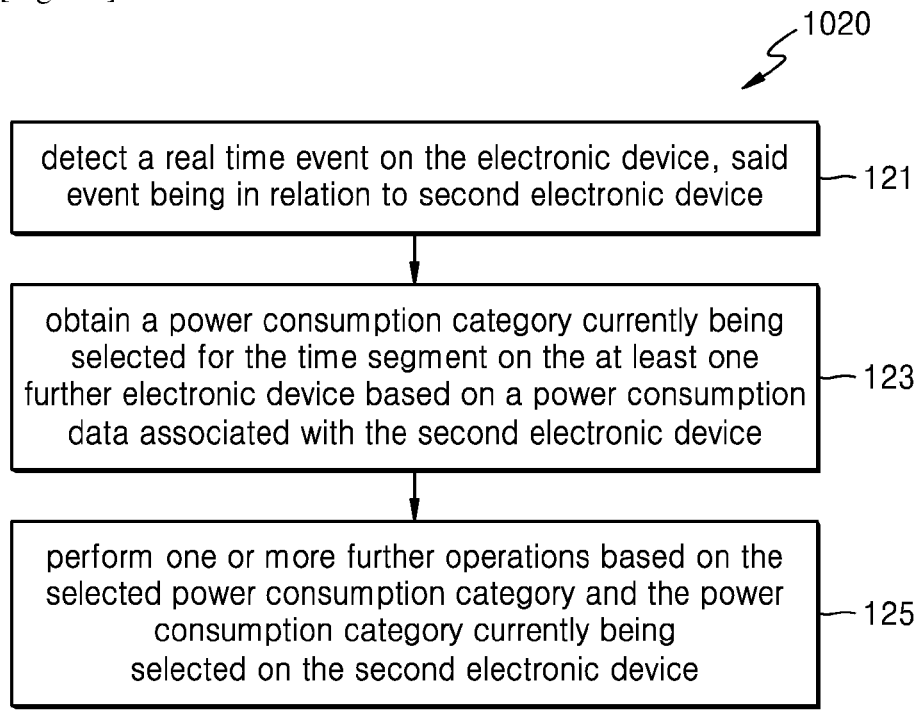
[Fig. 2]
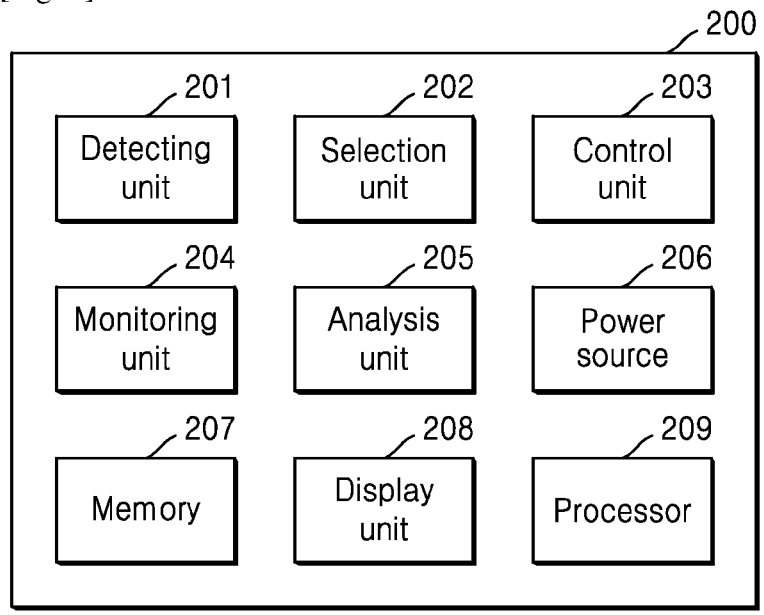

[Fig. 3A]
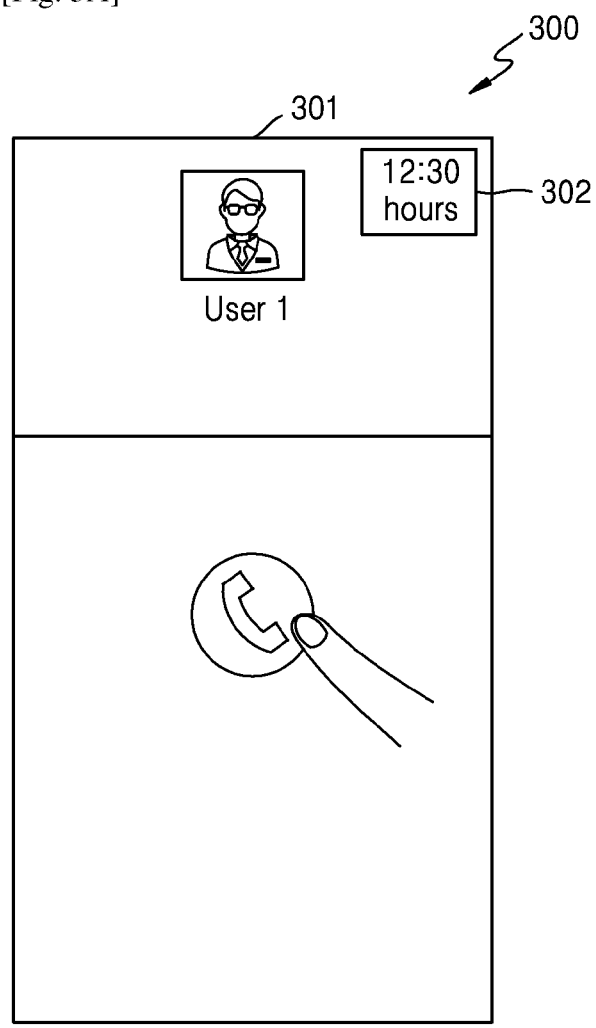

[Fig. 3B]
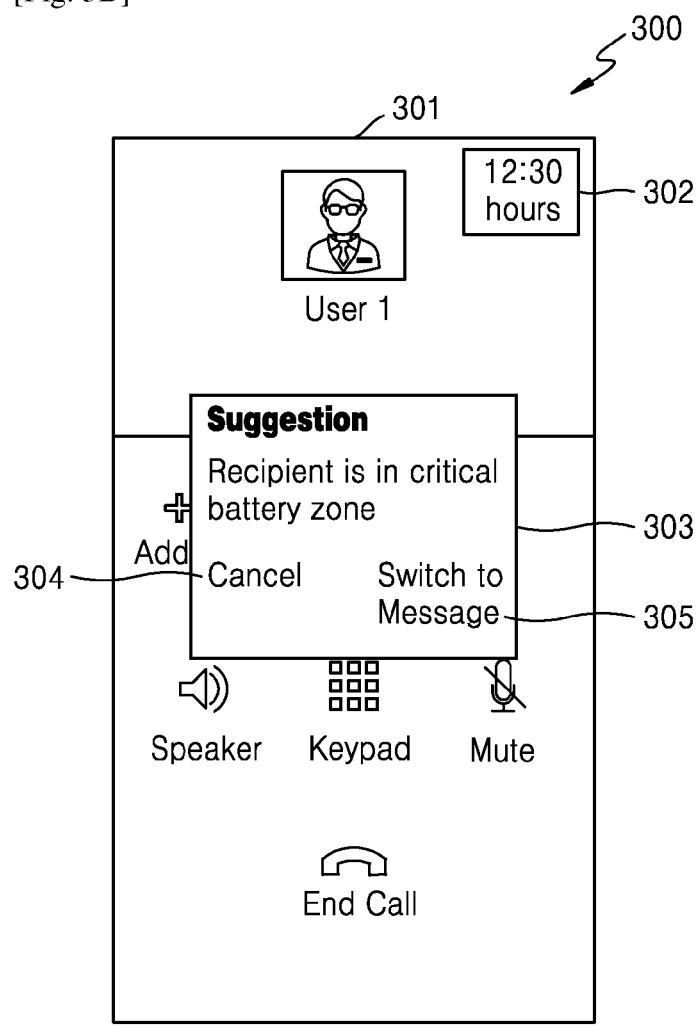

[Fig. 4A]
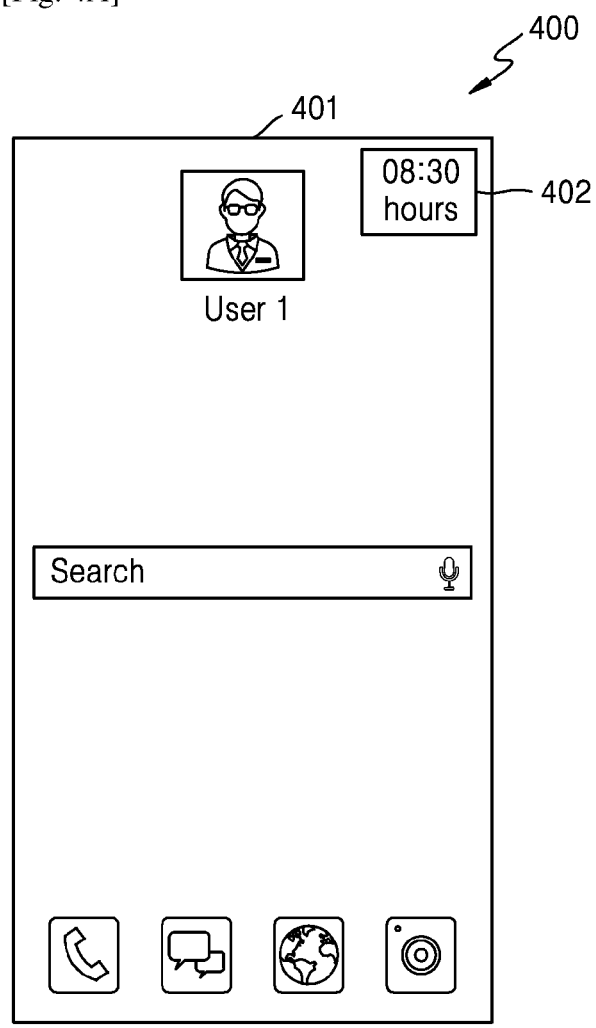

[Fig. 4B]
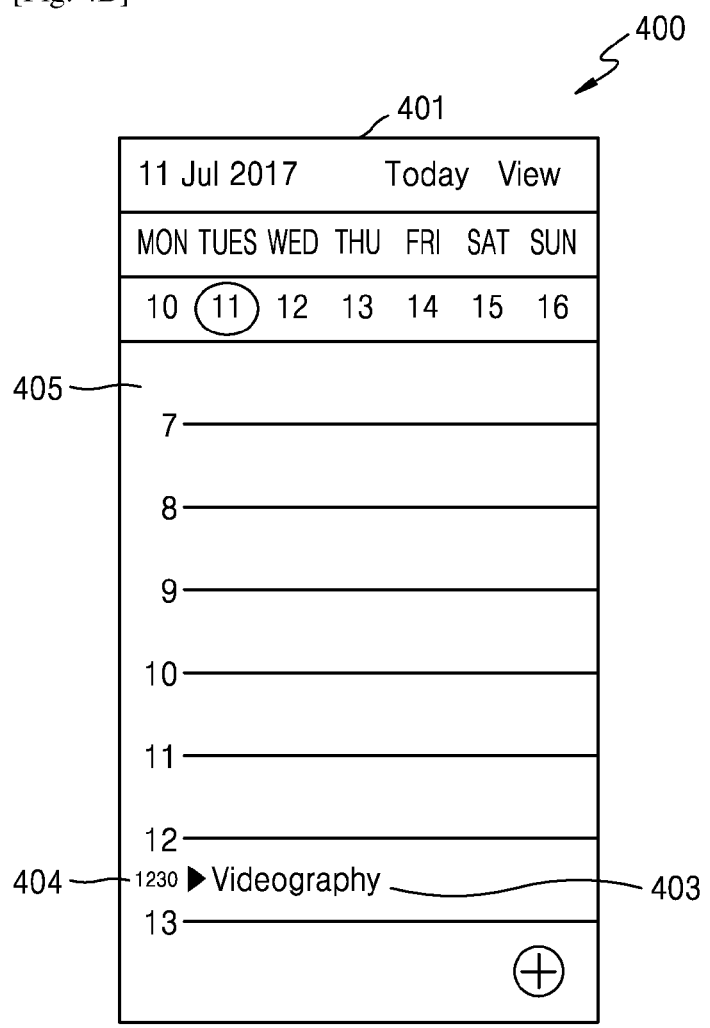

[Fig. 4C]
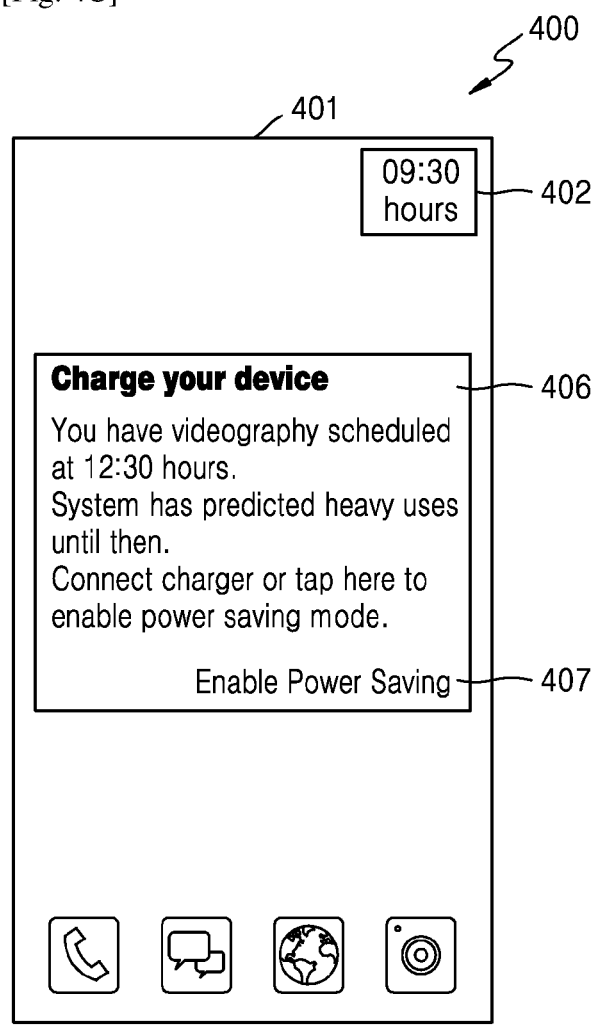

[Fig. 5]
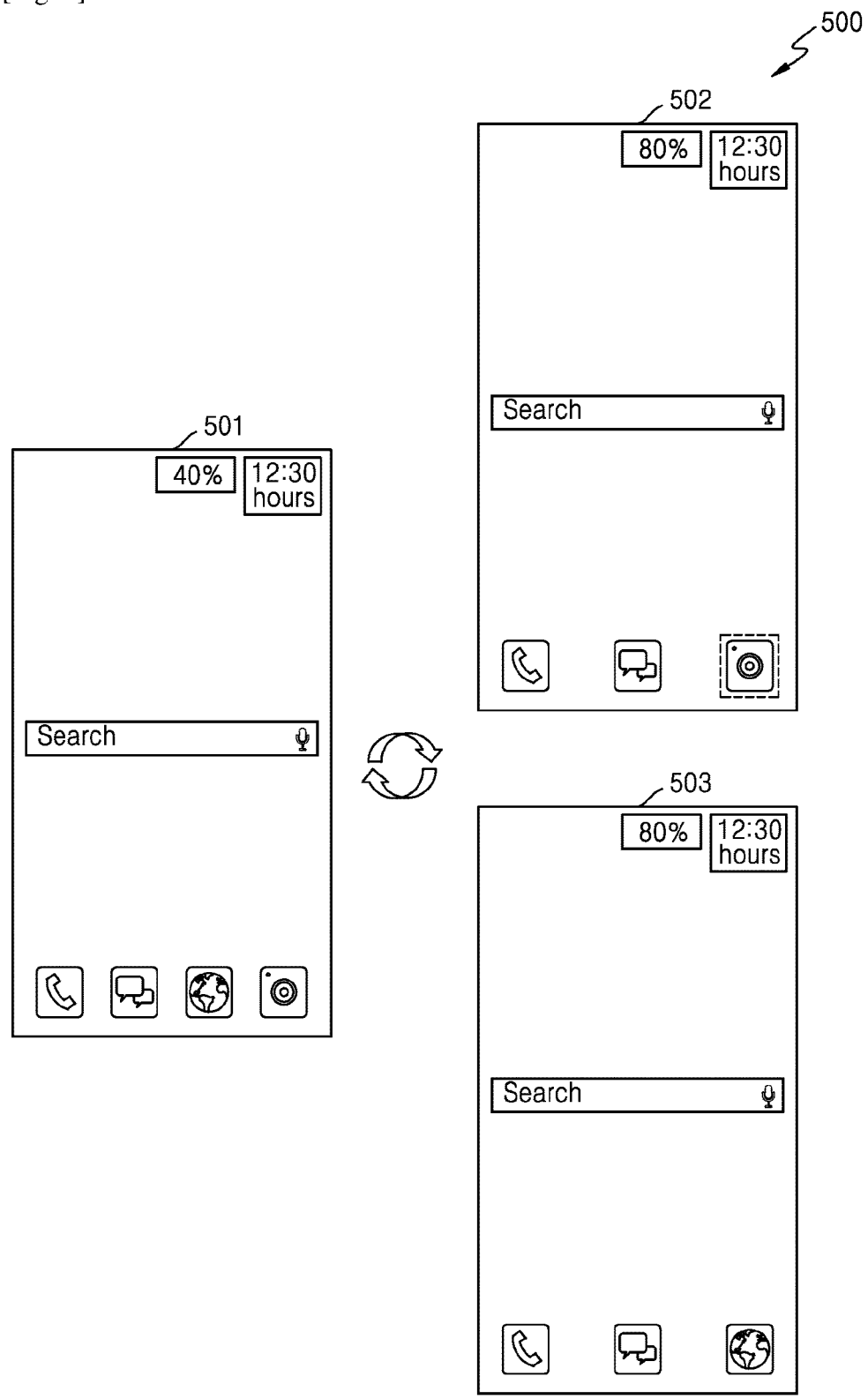

[Fig. 6]
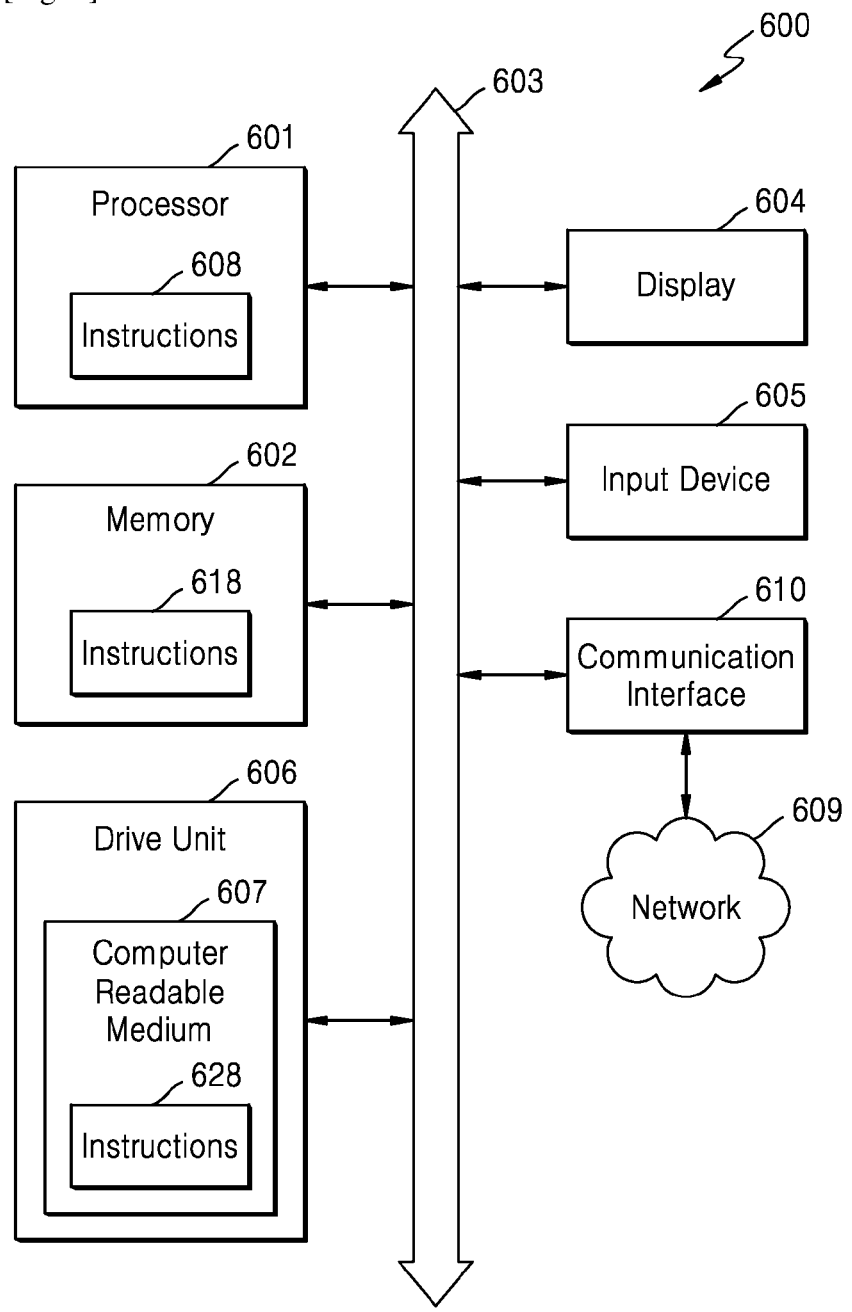

METHOD AND APPARATUS FOR POWER MANAGEMENT OF ELECTRONIC DEVICE

TECHNICAL FIELD

The present disclosure generally relates to power management of an electronic device.

BACKGROUND ART

Portable electronic devices such as smartphones, tablets, and notebooks, are becoming more and more omnipresent. These devices are usually powered by batteries. A user relies on such a device to make phone calls, send messages, take pictures, record videos, stay updated with the latest news, and much more. The usage of these activities indicates a user's behavior and preferences for using the device. Consequently, the power consumption of such devices has rapidly increased. As a result, the user desires to have a relatively large power to use such devices. Various solutions have been provided for power management to optimize the power consumption in addition to providing optimum hardware, i.e., a higher capacity battery.

DISCLOSURE OF INVENTION

Solution to Problem

This summary introduces a selection of the methods of the disclosure in a simplified format. These methods are further described in the detailed description of the disclosure. This summary is not intended to identify key or essential inventive concepts of the disclosure, nor is intended to determine the scope of the disclosure.

In accordance with the purposes of the disclosure, the present disclosure relates to a method for power management of an electronic device, the method comprising determining an onset of a predefined time segment corresponding to a time period; obtaining power consumption data by monitoring at least one of a current power consumption rate, a current device state, and a current device usage pattern of the device during the predefined time segment; selecting a power consumption category for the predefined time segment based on the power consumption data; switching from a first power saving mode active on the device to a second power saving mode based on the selected power consumption category; and performing one or more operations on the device based on the second power saving mode.

These aspects and advantages will be more clearly understood from the following detailed description taken in conjunction with the accompanying drawings and claims.

Advantageous Effects of Invention

Based on the method proposed in the disclosure, the power of the electronic device is efficiently and effectively managed based on time period and power consumption data.

BRIEF DESCRIPTION OF DRAWINGS

To further clarify the advantages and aspects of the disclosure, a more particular description of the disclosure will be rendered with reference to specific embodiments thereof, which are illustrated in the appended drawings. It will be appreciated that these drawings depict only some embodiments of the disclosure and are therefore not to be considered limiting of the scope. The disclosure will be described in detail according to the accompanying drawings, which are listed below for quick reference.

FIGS. 1A, 1B and 1C illustrate a method for power management of an electronic device, in accordance with an embodiment of the present disclosure.

FIG. 2 illustrates an electronic device for power management, in accordance with an embodiment of the present disclosure.

FIGS. 3A and 3B illustrate a first example of power management, in accordance with an embodiment of the present disclosure.

FIGS. 4A, 4B and 4C illustrate a second example of power management, in accordance with an embodiment of the present disclosure.

FIG. 5 illustrates a third example of power management, in accordance with an embodiment of the present disclosure.

FIG. 6 illustrates a hardware configuration of the electronic device, in accordance with an embodiment of the present disclosure.

It may be noted that like reference numerals have been used to represent like elements in the drawings. Further, those of ordinary skill in the art will appreciate that elements in the drawings are illustrated for simplicity and may not have been necessarily drawn to scale. Furthermore, one or more elements may have been represented in the drawings by conventional symbols, and the drawings may show only specific details that are pertinent to understanding the embodiments of the disclosure so as not to obscure the drawings with details that will be readily apparent to those of ordinary skill in the art.

BEST MODE FOR CARRYING OUT THE INVENTION

Provided is a method for power management of a device, the method comprising determining an onset of a predefined time segment corresponding to a time period; obtaining power consumption data by monitoring at least one of a current power consumption rate, a current device state, and a current device usage pattern of the device during the predefined time segment; selecting a power consumption category for the predefined time segment based on the power consumption data; switching from a first power saving mode active on the device to a second power saving mode based on the selected power consumption category; and performing one or more operations on the device based on the second power saving mode.

The detecting the onset of the predefined time segment comprises detecting the onset of the predefined time segment corresponding to the time period based on a current time.

The switching from the first power saving mode active on the device to the second power saving mode further based on a current screen-state of the device.

The time period is at least one of a year, a half of a year, a quarter of a year, a month, a week, and a day and the predefined time segment is adjusted based on the time period.

The one or more operations comprises controlling a screen brightness of the device by a predefined value, controlling a duration for switching to screen-off state by a predefined value, clearing at least a portion of a memory of the device, terminating one or more background applications, controlling network access for one or more applications, controlling a reception of a notification from one or more other devices communicatively coupled with the device, and controlling an activation of one or more sensors associated with the device.

The current power consumption rate corresponds to a rate of battery percentage drop, the current device state corresponds to at least one of a power-on-state, a power-off-state, a screen-on-state, a screen-off-state, a charging state, and a discharging state of the device, and the device usage pattern corresponds to usage information of the device collected based on at least one of a user action and a user preference.

The method further comprises performing a set of actions on the device based on the monitoring.

The set of actions comprises detecting current available power based on the current power consumption rate, detecting available power for a next time segment of the time period based on the current available power, and generating a notification indicative of the detected available power on the device.

The set of actions comprises detecting a current power consumption category for the predefined time segment based on at least one of the current power consumption rate, the current device state, and the current device usage pattern of the device monitored upon the expiration of the predefined time segment; deriving a second power consumption category for the predefined time segment of a next time period based on the current power consumption category; updating power consumption data with the second power consumption category; and sharing the updated power consumption data with a second device.

The set of actions comprises determining an action to be performed on the device at a next time segment of the time period; obtaining a second power consumption category for the next time segment based on the power consumption data; generating a notification on the device based on at least one of the action, the second power consumption category, and a current available power of the device.

The set of actions further comprises identifying a second device for performing the action; comparing the second power consumption category for the next time segment and a third power consumption category of the second device for the next time segment; and performing one or more additional operations based on the comparison.

The method further comprises detecting a real-time event on the device; selecting a second power consumption category for the time segment on a second device based on power consumption data associated with the second device; performing one or more additional operations based on the second power consumption category and the power consumption category.

The real-time event comprises at least one of a user input of initiating a communication with the second device, a user input of sharing one or more data with the second device, and an incoming call from the second device.

The method further comprises obtaining a power consumption mapping data by mapping a plurality of the selected power consumption categories to a plurality of time segments for the time period.

Provided is an apparatus for power management, the apparatus comprising: a display; a detecting unit configured to monitor at least one of a current power consumption rate, a current device state, and a current device usage pattern of the apparatus during a predefined time segment; and at least one processor configured to: determine an onset of the predefined time segment corresponding to a time period, obtain power consumption data by monitoring performed by the detecting unit, select a power consumption category for the predefined time segment based on the power consumption data, switch from a first power saving mode to a second power saving mode based on the selected power consumption category, and perform one or more operations on the device based on the second power saving mode.

MODE FOR THE INVENTION

It may be advantageous to set forth definitions of certain words and phrases used throughout this document. The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Moreover, various functions described below can be implemented or supported by one or more computer programs, each of which is formed from computer-readable program code and embodied in a computer-readable medium. The terms "application" and "program" refer to one or more computer programs, software components, sets of instructions, procedures, functions, objects, classes, instances, related data, or a portion thereof adapted for implementation in a suitable computer-readable program code. The phrase "computer-readable program code" includes any type of computer code, including source code, object code, and executable code. The phrase "computer-readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer-readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those skilled in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments set forth below, represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Throughout the description, terms of a power consumption data and a power consumption mapping data may be used interchangeably or independently in accordance with respective embodiments.

In one solution to a battery management, a controller installed in a mobile device determines whether a remaining battery life is enough to run future applications based on a usage pattern of a user and power consumption of a preceding application running before the future application. Based on the determination, the controller outputs a notification on the mobile device informing the user that the battery power of the mobile device is low. In addition, the controller monitors the usage of the mobile device for a period of time and generates a power profile indicating power consumptions of currently running applications of the mobile device based on the monitored usage. Thereafter, the power consumption of the future application and the power consumption of the preceding application are determined based on the power profile.

In another solution, a system monitors a remaining battery charge level in a mobile computer cart used in a hospital environment and detects when the battery charge level reaches a predetermined selected level. Once a low battery charge level and/or the predetermined selected level have been reached, the system sends a customizable alert to a user. Thereafter, the system automatically places the mobile computer cart in detect and protect mode after a predetermined period of time after the alerts have been sent. The threshold values are determined based on monitoring the mobile computer cart over a period of time for various parameters such as change in a battery charge percentage in a given time period, battery charge cycles, a time taken to fully charge the battery, a time period for which a medical mobile computer cart was plugged in for charging, a time period of battery discharge, a depth of battery discharge, a discharge and charge pattern in a day/week/month/year, a battery load, and a number of times the battery was depleted to an empty battery.

These solutions enable monitoring of devices, calculating the remaining battery usage time or available power, and sending notifications to a user. However, these solutions do not account for power management and thus a user has to manually perform actions to save the remaining power. Hence, there is a need for a solution that overcomes this deficiency.

FIGS. 1A, 1B, and 1C illustrate a method 1000 for power management in an electronic device, in accordance with an embodiment of the present disclosure. The electronic device is further capable of being paired or communicatively coupled with one or more further devices over a wired/wireless network.

Referring to FIG. 1A, in operation 101, an onset of a predefined time segment corresponding to a time period is determined based on a current time. The time period may be one of a year, a quarter of a year, a half of a year, a month, a week, and a day. The time segment can be a predefined minimum unit of the time period by adjusting the time period. For example, the time segment may be an hour, if the time period is a day or the time segment may be a day, if the time period is a week.

In operation 103, the device may monitor at least one of a current power consumption rate, a current device state, and a current device usage pattern of the device during the predefined time segment.

In operation 105, a power consumption category is selected for the time segment based on power consumption data associated with the electronic device. The power consumption data may indicate a mapping of a plurality of power consumption categories with a plurality of time segments corresponding to one or more time periods. The plurality of power consumption categories are determined based on a power consumption rate, a device state, and a device usage pattern monitored over the plurality of time segments prior to the current time period.

In operation 107, a first power saving mode, which is currently active on the electronic device, is switched to a second power saving mode. The switching may be performed based on at least one of the power consumption category thus selected and a current screen-state of the electronic device. The power saving mode may be indicative of one or more operations to be performed on the electronic device upon activation.

In operation 109, the one or more operations are performed on the electronic device based on the second power saving mode thus activated. The one or more operations may be:

(a) controlling a screen brightness of the electronic device by a predefined value;

(b) controlling a duration for switching to screen-off state by a predefined value;

(c) clearing at least a portion of a memory of the electronic device;

(d) terminating one or more background applications;

(e) controlling network access for one or more applications;

(f) controlling a reception of a notification from one or more transmitting devices communicatively coupled with the electronic device; and (g) controlling an activation of one or more sensors associated with the electronic device.

Referring to FIG. 1B, the method 1010 further comprises operations in relation to performing any activity/action on the electronic device without user intervention upon switching the power saving mode and performing the one or more operations. In operation 111, a current power consumption rate, a current device state, and a current device usage pattern of the electronic device are monitored during the time segment.

In operation 113, a set of actions are performed on the electronic device based on the monitoring. In an embodiment, the set of actions include detecting current available power based on the current power consumption rate; determining available power for a next time segment of the time period based on the current available power and the power consumption data; and generating a notification indicative of the available power thus detected on the electronic device.

In an embodiment, the set of actions include detecting a current power consumption category for the predefined time segment based on at least one of the current power consumption rate, the device state, and the device usage pattern monitored upon expiration of the time segment; deriving a further power consumption category for the time segment of a next time period based on the current power consumption category, and/or at least one predetermined factor; and updating the power consumption data with the further power consumption category derived for the time segment. Further, the set of actions may include sharing the power consumption data updated with at least one further electronic device.

In an embodiment, the set of actions include determining an action to be performed on the electronic device at a further time segment of the time period, the determination of the action being performed based on at least one parameter; obtaining of a power consumption category for the further time segment based on the power consumption data; generating a notification on the electronic device based on the determined action, the selected power consumption category for the further time-segment, and current available power.

In an embodiment, the set of actions further include identifying at least one further electronic device for performing said action; comparing a power consumption category currently being selected for the further time segment on the at least one further electronic device with the selected power consumption category for the further time segment; and performing one or more additional operations based on the comparison.

Referring to FIG. 1C, the method 1020 further comprises operations in relation to any real-time event on the electronic device upon switching the power saving mode and performing the one or more operation. In operation 121, a real-time event is detected on the electronic device. The event may be in relation to at least one further electronic device. Further, the real-time event may include one of a user input of initiating a communication with the at least one further electronic device; a user input of sharing one or more data files the at least one further electronic device; and an incoming call from the further electronic device.

In operation 123, a power consumption category which is currently being selected for the time segment on the at least one further electronic device is obtained based on power consumption data associated with the at least one further electronic device.

In operation 125, one or more further operations are performed based on the selected power consumption category and the power consumption category currently being selected on the further electronic device.

FIG. 2 illustrates an electronic device 200 capable of performing power management, in accordance with an embodiment of the present disclosure. Examples of the electronic device include, but are not limited to, a smartphone, a wearable device, a smart device, a laptop, a tablet, and a Personal Digital Assistance (PDA). The electronic device 200 performs the method 1000, 1010 and 1020 as described in reference to FIGS. 1A, 1B and 1C. Further, the electronic device 200 is capable of being paired or communicatively coupled with one or more further electronic devices over a wired/wireless network (not shown in the figure). Examples of the further electronic device include, but are not limited to, a smartphone, a wearable device, a smart device or an Internet of Things (IoT) device, a laptop, a tablet, a Personal Digital Assistance (PDA). Examples of the wireless network include, but are not limited to, Wi-Fi, Bluetooth, cloud-based network, home network, and Internet of Things (IoT) network, or combinations thereof.

The electronic device 200 may include a detecting unit 201, a selection unit 202, a control unit 203, a monitoring unit 204, and an analysis unit 205 to enable power management. The detecting unit 201, the selection unit 202, the control unit 203, the monitoring unit 204, the analysis unit 205 are hardware components and may be implemented as at least one hardware processor. The electronic device 200 may further include a power source 206 such as a battery. The power source 206 may be rechargeable. The detecting unit 201 may detect an onset of a predefined time segment corresponding to a current time period based on a current time. The time period may be one of a year, a half of a year, a quarter of a year, a month, a week, and a day. The time segment may be a predefined minimum unit of the time period. The minimum unit may be either predefined during manufacturing of the device or predefined by user settings during operation of the device. In an example, the current time period is a day and the predefined time segment is a two-hour window. In this example, the current time is 08:00 on Jul. 10, 2017 (Monday) and therefore the time segment being detected is a two-hour window from 08:00 to 10:00.

Upon detection of the time segment, the selection unit 202 may select a power consumption category for the time segment based on power consumption data associated with the electronic device 200. The power consumption data may be obtained by monitoring a power consumption rate, a device state, and a device usage pattern over the plurality of time segments. Power consumption mapping data may be obtained by mapping a plurality of power consumption categories with a plurality of time segments corresponding to one or more time periods. The power consumption categories may be determined based on the power consumption rate, the device state, and the device usage pattern monitored over the plurality of time segments prior to the current time period. Examples of the power consumption categories include, but are not limited to, very low (VL), low (L), medium (M) and high (H). The terms of the power consumption category and the power consumption level can be used interchangeably. The power consumption rate indicates the drop of battery percentage. Examples of the device state include a power-on-state, a power-off-state, a screen-on-state, a screen-off-state, a charging/discharging state, etc. The device usage pattern may indicate the usage information of the electronic device 200 collected based on at least one of a user action and a user preference. The user action may be, for example, playing of pre-stored media files, streaming of media files, playing of games, browsing, communicating over social media applications, emailing, creating data files, etc. The user preferences may be, for example, a frequent usage of applications by the user or a usage of applications at certain preferred time slot by the user such as a usage of chatting application at night time, a usage of weather forecast application at morning time, etc.

Accordingly, the monitoring unit 204 may monitor the power consumption rate, the device state, and the device usage pattern of the electronic device 200 for a plurality of time periods to determine the power consumption data. This enables creation of seed data to implement the power management for realistic predictions. In an embodiment, the monitoring unit 204 may monitor the electronic device 200 automatically and periodically, for example, at least one week after the electronic device 200 is reset/reboot. In another embodiment, the monitoring unit 204 may monitor the electronic device 200 based on a user input.

In the above example, the power consumption mapping data indicates the mapping of the power consumption categories for each two-hour window (i.e., the time segment) of each day (i.e., the time period) of the week prior to Jul. 10, 2017, i.e., July 3-July 9. On Monday, the monitoring unit 204 may monitor the power consumption rate between 00:00-02:00, 02:00-04:00, 04:00-06:00, 06:00-08:00, 08:00-10:00, and 10:00-12:00 as 0%, 0%, 0%, 7%, 25%, and 40% respectively. The device states between the above time segments are monitored as 'OFF', 'OFF', 'OFF', 'ON', 'ON' and 'ON' respectively. Further, the user uses a music player application to listen to music between 09:00-10:00 and a video player application between 10:00-11:30. The monitoring unit 204 may also monitor when the charging is resumed in the electronic device 200. In the example, the monitoring unit 204 may monitor that the charging is resumed between 08:00-10:00. This monitoring is done for 24 hours each day.

Based on the above monitoring for each two-hour time segment in the week, the analysis unit 205 may determine the power consumption category using various techniques. Examples of such techniques include, but are not limited to, regression analysis, arithmetic mean, arithmetic median, static values defined at manufacturing time, Equal intervals, Quantiles, maximum breaks, Natural breaks, etc. For the sake of clarity and brevity, it is considered hereinafter that the determination of the power consumption categories as very low (VL), low (L), medium (M) and high (H) is based on the arithmetic mean technique. Consequently, the analysis unit 205 may determine the power consumption category by calculating a mean (hereinafter referred to as a first mean) of the monitored power consumption rates. The power consumption rates thus monitored which are lower than the first mean are denoted as 'low power consumption category', i.e., 'L'. The power consumption rates thus monitored which are equal to the first mean are denoted as 'medium power consumption category', i.e., 'M'. The power consumption rates thus monitored which are greater than the first mean are denoted as 'high power consumption category, i.e., 'H'.

The analysis unit 205 may further calculate a mean (herein after referred to as a second mean) of the monitored power consumption rates which are lower than the first mean (as calculated above). The power consumption rates thus monitored which are lower than the second mean are denoted as 'very low power consumption category, i.e., 'VL'. The power consumption rates thus monitored which are greater than the second mean but lower than the first mean are updated as 'low power consumption category', i.e., 'L'.

The analysis unit 205 may further calculate a mean (herein after referred to as third mean) of the monitored power consumption rates which are greater than the first mean (as calculated above). The power consumption rates thus monitored which are greater than the first mean but lower than the third mean are updated as 'medium power consumption category', i.e., 'M'. The power consumption rates thus monitored which are greater than the third mean are updated as 'high power consumption category, i.e., 'H'.

Considering the above example of the week period July 3-July 9, the first mean is calculated as 50%, the second mean is calculated as 20%, and the third mean is calculated as 70%. Therefore, the power consumption rates monitored between '0-20%' are denoted as 'VL', the power consumption rates monitored between '20-50%' are denoted as 'L', the power consumption rates monitored between '50-70%' are denoted as 'M', and the power consumption rates monitored between '70-100%' are denoted as 'H', as illustrated below in Table 1.

TABLE 1

| Mean | Denoted As |
| --- | --- |
| 0~20% | VL (Very Low) |
| 20~50% | L (Low) |
| 50~70% | M (Medium) |
| 70~100% | H (High) |

Accordingly, the power consumption mapping data is obtained by mapping the above obtained power consumption categories for each two-hour time segment in the week, July 3-July 9. The power consumption mapping data is then stored in a memory 207 of the electronic device 200. Examples of the memory 207 include, but are not limited to, a computer-readable storage media such as various types of volatile and non-volatile storage media, including, but not limited to random access memory, read-only memory, programmable read-only memory, electrically programmable read-only memory, electrically erasable read-only memory, flash memory, magnetic tape or disk, optical media and the like.

In an embodiment, the control unit 203 may share the power consumption mapping data saved in the memory 207 with a server (not shown in the figure) over the wired or the wireless network using techniques such as Bluetooth, Wi-Fi-direct, Wi-Fi, mobile data, cloud data, etc. In an embodiment, the control unit 203 may share the power consumption mapping data saved in the memory 207 with the further devices (not shown in the figure) over the wired or the wireless network using techniques such as Bluetooth, Wi-Fi-direct, Wi-Fi, mobile data, cloud data, etc. This enables availability of the power consumption mapping data with any other device, as explained later. Table 2 illustrates an example of power consumption mapping data associated with the electronic device 200.

TABLE 2

| (in hours) | Monday July 3 | Tuesday July 4 | Wednesday July 5 | Thursday July 6 | Friday July 7 | Saturday July 8 | Sunday July 9 |
| --- | --- | --- | --- | --- | --- | --- | --- |
| 0000-0200 | VL | VL | VL | VL | VL | VL | VL |
| 0200-0400 | VL | VL | VL | VL | VL | VL | VL |
| 0400-0600 | VL | L | VL | L | VL | VL | VL |
| 0600-0800 | VL | L | L | VL | VL | VL | VL |
| 0800-1000 | L | L | L | M | M | VL | VL |
| 1000-1200 | M | M | M | L | L | M | M |
| 1200-1400 | M | M | M | M | M | H | H |
| 1400-1600 | M | M | M | H | H | H | H |
| 1600-1800 | H | M | M | H | H | H | H |
| 1800-2000 | M | H | H | M | M | M | M |
| 2000-2200 | L | M | L | M | L | M | M |
| 2200-2400 | VL | VL | VL | VL | VL | VL | VL |

Thus, upon creation of the power consumption mapping data, the detecting unit 201 may initiate the process of detecting the time-segments. Based on the process of detecting, the selection unit 202 may select a power consumption category for the detected time-segment. In the example when detection starts at 08:00 on July 10, the selection unit 202 selects 'L' as the power consumption category for the time segment "08:00-10:00" corresponding to the time period "Monday."

Upon selection of the power consumption category, the control unit 203 may switch a first power saving mode currently active on the electronic device to a second power saving mode based on the power consumption category thus selected and a current screen-state of the electronic device 200. Examples of the screen state include a screen-on state and a screen-off state. In this example, the current screen-state of the electronic device is the screen-on state. The power saving mode is a mode that, when activated, optimizes/manages power for the electronic device 200 during the ongoing time segment. The power saving mode therefore is indicative of one or more operations that are automatically performed on the electronic device 200 for power management/optimization. The power saving modes are mapped with the power consumption category. Examples of the power saving mode include, but are not limited to, minimum, medium, optimal and maximum. The minimum power saving mode corresponds to the 'H' power consumption category. The medium power saving mode corresponds to the 'M' power consumption category. The optimal power saving mode corresponds to the 'L' power consumption category. The maximum power saving mode corresponds to the 'VL' power consumption category. The analysis unit 205 may determine the power saving mode based on the power consumption category and store the mapping in the memory 207 in the form of power saving mode data.

Accordingly, the control unit 203 may fetch the power saving mode data from the memory 207 and determine the second power saving mode that is to be activated on the electronic device 200 for the current time segment. Thereafter, the control unit 203 may deactivate the first power saving mode and activate the second power saving mode. In the above example, the first power saving mode, i.e., the maximum power saving mode, is mapped with time segment 06:00-08:00 hours. Upon detection of the current time as 08:00, the second power saving mode i.e., optimal power saving mode, mapped with time segment 08:00-10:00, is activated. The control unit 203 may further perform the one or more operations on the electronic device 200 based on the activated second power saving mode. The one or more operations may be at least one of, for example, controlling a screen brightness of the electronic device 200 by a predefined value; controlling a duration for switching to the screen-off state by a predefined value; emptying at least a portion of a memory of the electronic device 200; terminating one or more background applications; controlling a network access for one or more applications; controlling a reception of a notification from one or more transmitting devices communicatively coupled with the electronic device 200; and controlling an activation of one or more sensors associated with the electronic device 200.

Accordingly, in an example, upon activation of the minimum power saving mode, a Wi-Fi scanning duration is increased by 10% and a Bluetooth scanning duration is increased by 10%. In another example, upon activation of the medium power saving mode, the Wi-Fi scanning duration is further increased by 10%, a sensor polling duration is increased by 10%, and the reception of the notification from one or more transmitting devices is discarded in the screen-off state. In another example, upon activation of the optimal power saving mode, the memory of the electronic device is emptied, all of the background applications are terminated, the Wi-Fi scanning duration is further increased by 10%, a screen brightness of the electronic device is decreased by 20%, and the duration for switching to the screen-off state is set from 60 seconds to 10 seconds. In another example, upon activation of the high power saving mode, the memory of the electronic device is emptied, all of the background applications are terminated, reception of notification from one or more transmitting devices is discarded, sensor polling duration is increased by 25%, Wi-Fi scanning duration is further increased by 50%, screen brightness of the electronic device is decreased by 30%, and the duration for switching to screen-off state is set to 1 seconds.

In an embodiment, the selection unit 202 may further select a resource allocation strategy from a resource allocation strategy set associated with the electronic device 200. The resource allocation strategy set may indicate a mapping of plurality of resource allocation strategies with a plurality of time segments corresponding to one or more time periods. The resource allocation strategy may be indicative of a number of resources to be allocated during the time segment, a type of resources to be allocated during the time segment, and suspension of one or more resources allocated during the time segment prior to the current time period. The mapping is performed in a manner similar to mapping of the power saving mode with the time segment as described above. In an example, a resource allocation strategy indicative of suspending all resources is mapped with time segment 06:00-08:00. In another example, a resource allocation strategy indicative of allocating only two resources is mapped with time segment 08:00-10:00. In such implementation, the control unit 203 may switch the power saving mode based on the selected power consumption category, the selected resource allocation strategy, and the current screen-state of the electronic device 200.

Upon switching the power saving mode and performing the one or more operations, the monitoring unit 204 may monitor a current power consumption rate, a current device state, and a current device usage pattern of the electronic device 200 during the time segment. Based on such monitoring, the analysis unit 205 and the control unit 203 may perform various actions on the electronic device 200.

Accordingly, in an embodiment, the control unit 203 may determine current available power based on the current power consumption rate using techniques known in the art. The control unit 203 may determine an available power for a further time segment of the time period based on the current available power and the power consumption data. In an embodiment, the control unit 203 may determine the available power as:

Remaining battery usage time=($N$)*time-segment, where $N$=Number of next consecutive time segment with sum of power consumption rate less than equals to current power consumption rate; and time-segment is the minimum unit as defined above. (Equation 1)

Available Power=Power consumption rate $avg1$+ Power consumption rate $avg2$+ . . . +Power consumption rate $avgN$ (Equation 2)

Thus, such a determination of available power is dependent on the device usage pattern and therefore is more realistic. Upon determining, the control unit 203 may generate a notification indicative of the available power determined on the electronic device 200. The control unit 203 then may display the notification on a display unit 208. Examples of the notification include a text message, a floating message. In an example, the notification may be provided in a graph format. In another example, the notification may also indicate current power consumption in accordance with the device usage pattern. Examples of the display unit 208 include, but are not limited to, a touch screen and a non-touch display screen.

In another embodiment, the control unit 203 may determine an action to be performed on the electronic device 200 at a further time segment of the time period based on at least one parameter. Examples of such activities include, but are not limited to, listening to pre-stored music, playing streaming media, performing video conferencing/call, taking videos/images, and playing high-data-driven game. The at least one parameter may include the device usage pattern; contextual data associated with the action, and a pre-stored list of activities. Examples of the contextual data include, but are not limited to, textual data sent/received from the at least one further device via applications such as social media application, email application, and chat application. Examples of the pre-stored list of activities include, but are not limited to, event information scheduled in a calendar installed in the electronic device 200.

Upon determining the action, the control unit 203 may obtain a power consumption category for the further time segment based on the power consumption data. Accordingly, the control unit 203 may fetch the power consumption data from the memory 207 and identify the power consumption category mapped with the further time segment. In the above example, the action is to be performed at 12:30. In such example, the control unit 203 may identify the further time segment as 12:00-14:00 and the corresponding power consumption category as 'M'. Thereafter, the control unit 203 may generate a notification on the electronic device 200 based on the determined action, the selected power consumption category for the further time-segment, and the current available power. The control unit 203 may generate the notification if the current available power indicates a possibility of 'less power' than required for performing the action at the further time segment and a prediction of 'higher power requirement' as per the selected power consumption category. Examples of the notification include a text message, a floating message. The notification may indicate charging of the electronic device 200 to obtain necessary power to perform the action. In an example, the action is to perform a video call at 12:30. In such example, the control unit 203 may generate a notification indicating 'to charge the device' since available power will be less at 12:30. Thus, the control unit 203 provides an alert to the user to charge as per context and eliminates manual intervention to continuously check for remaining power in the device.

In an embodiment, the control unit 203 may further identify at least one further electronic device for performing the action at the further time segment. In an embodiment, the electronic device 200 may be communicatively connected/coupled & synched with the at least one further electronic device over the network. In an example, the electronic device 200 is coupled or synched with the at least one further electronic device via an application available on both the electronic device 200 and the further electronic device. Such an application may be used for performing various functions such as sharing data between the devices; and controlling the further electronic device via the electronic device 200 and vice-versa, etc. The control unit 203 may further identify the further electronic device(s) based on various parameters such as locations of the electronic device 200 and the further electronic device(s), proximity of the electronic device 200 to the further electronic device(s), and availability of functionality(s) in the further electronic device(s) to perform the action. In an example, the action is taking photos during a hiking trip at 12:30. The control unit 203 may identify a further device having a camera application based on detecting same location of the further device and the electronic device 200, and obtaining device data related to the further device. The electronic device 200 may obtain device data related to the further device during a synch process.

Upon identifying the at least one further device, the control unit 203 may obtain power consumption data for the identified further device. In an implementation, the control unit 203 may obtain power consumption data periodically after expiry of every time segment from a server (not shown in the figure) via the wireless network. The server may obtain the power consumption data related to various devices including the electronic device 200 periodically and share the data as and when required by the electronic device 200. In an embodiment, the control unit 203 may obtain the power consumption data periodically after expiry of every time segment from the further device via the wireless network. In another embodiment, the control unit 203 may obtain power consumption data from the further device via the wireless network prior to the further time segment when the action is to be performed. Based on the power consumption data, the control unit 203 may identify the power consumption category currently being selected for the further time segment on the at least one further electronic device.

Thereafter, the control unit 203 may compare the power consumption category currently being selected for the further time segment on the at least one further electronic device with the selected power consumption category for the further time segment on the electronic device 200. The control unit 203 may then perform one or more operations based on a comparison result. Examples of the one or more further operations include, but are not limited to, generating a notification on the at least one further electronic device; generating an alert on the at least one further electronic device; and invoking an application on the at least one further electronic device to perform the action. The control unit 203 may generate the notification if the current available power indicates an availability of 'sufficient or higher power' as required for performing the action. In the above example, the control unit 203 may make the camera application blink on the further device for 'taking photos'. Thus, the control unit 203 may identify the best device for performing action and thereby optimizing power of other devices.

In an embodiment, the control unit 203 may detect a real-time event on the electronic device 200. The event may be in relation to the at least one further electronic device, which is not communicatively coupled with the electronic device 200. In an example, the real-time event may be a user input indicative of initiating a communication with the at least one further electronic device. Such communication may be initiated via an application such as calling application (with/without data), social media application, chat application, email application, etc. In another example, the real-time event may be a user input indicative of sharing one or more data files with the at least one further electronic device. Such sharing may be performed via an application such as social media application, chat application, email application, etc. In an example, the real-time event may be an incoming call from the further electronic device. Such an incoming call may be received from either a native calling application or a data-based calling application.

Upon detecting, the control unit 203 may obtain a power consumption category currently being selected for the time segment on the at least one further electronic device based on power consumption data associated with the at least one further electronic device. The control unit 203 may obtain the power consumption category for the further device as described above. The control unit 203 then may perform further operations based on the selected power consumption category and the power consumption category currently being selected on the further electronic device. The control unit 203 may perform the further operations if the power consumption categories of either of the devices indicate a possibility of 'less power' than required for completion of the real-time event. Examples of the notification include a text message and a floating message.

In an example, the operation may include generating a notification on the electronic device 200. In another example, the operation may be generating a notification on the at least one further electronic device. In another example, the operation may be generating a notification on a device communicatively coupled with the electronic device 200. In another example, the operation may include controlling a resolution of the one or more data files prior to sharing. In another example, the operation may include compressing a size of the one or more data files prior to sharing. In one example, the real-time event may be initiating a chat with the further device at a time when the power consumption category is 'VL' for the further device. As such, the control unit 203 may generate a notification that the further device is not available for communicating. The control unit 203 may display the notification on the display unit 208. In an example, the real-time event may be sharing of media files at a time when the power consumption category is 'L' for the further device. As such, the control unit 203 may reduce the resolution of the media files and compress the media files prior to sharing. Thus, the control unit 203 may enable sharing of content faster even at low power. In addition, the control unit 203 may provide suggestion to the user for best time of communication with the other user and most probable used device for communication at other user's end. This prevents power consumption due to other user's action or non-availability of user for communication. In an example, the real-time event may be an incoming call from the further device on the electronic device 200 at a time when the power consumption category is 'VL' for the electronic device 200. As such, the control unit 203 may generate an incoming call notification on a device communicatively coupled with the electronic device 200 and operating at 'H' power consumption category at the same time. Thus, the user does not need to carry multiple devices.

In an embodiment, upon expiration of the time segment, the analysis unit 205 may determine a current power consumption category for the time segment based on the current power consumption rate, the device state, and the device usage pattern thus monitored. In an example, the analysis unit 205 may determine the current power consumption category for the time segment as 'H'. Based on the current power consumption category, the selected power consumption category, and at least one predetermined factor, the analysis unit 205 may derive a further power consumption category for the time segment of a further time period. The at least one predetermined factor may be a default factor defined by a manufacturer of the electronic device 200 or a factor defined by the user at the time of purchase of the electronic device 200. The analysis unit 205 then may update the power consumption data with the further power consumption category thus derived for the time segment. This enables realistic updating of the power consumption data and therefore realistic prediction of the power category for a next time segment.

In an embodiment, the analysis unit 205 may derive the further power consumption category for the time segment of a further time period according to the following formulae:

Further power consumption category($VL,L,M,H$)
=current power consumption category($VL,L,M,H$)+(at least one predetermined factor)*(selected power consumption category($VL,L,M,H$))   (Equation 3)

In an example, a value of the at least one predetermined factor is 0.9. In an embodiment, the factor may be predetermined during manufacturing of the electronic device by the manufacturer. In an embodiment, the factor may be predetermined based on the power consumption data.

In the above example, the predicted power consumption category for time segment '08:00-10:00' is 'L'. However, based on the device usage pattern and the current power consumption rate, the current power consumption category is determined at 10:01 as 'M'. Therefore, the further power consumption category is derived as 'H' based on the above formula (0,0,0,1)+0.9*(0,1,0,0)=(0,0.9,0,1).

The analysis unit 205 may then update the power consumption data with 'H' for "08:00-10:00" corresponding to July 17 "Monday". Thus, upon detection of the onset of time segment '08:00-10:00' on July 17 "Monday", the control unit 203 may select the power consumption category as 'H' rather than 'L'. This unlearning and learning of power consumption category helps in a realistic prediction based not only on previous data but also on current power consumption category and device usage. In an embodiment, artificial intelligence and/or machine learning may be incorporated such that the analysis unit 205 may be trained on current data, i.e., power consumption data, a power consumption category, a device usage pattern, and a device state, for quick and efficient prediction in the future.

The analysis unit 205 may further share the power consumption data updated with at least one further electronic device. In an embodiment, the analysis unit 205 may share the updated power consumption data corresponding to the time segment after expiry of every time segment via the wireless network with the further electronic device(s) communicatively coupled with the electronic device 200. In an embodiment, the analysis unit 205 may share the entire updated power consumption data periodically after expiry of each time period via the network with the further electronic device(s). In an embodiment, the analysis unit 205 may share the updated power consumption data corresponding to the time segment after expiry of every time segment via the wireless network with a server. In an embodiment, the analysis unit 205 may share the entire updated power consumption data periodically after expiry of each time period via the wireless network with the server. The server may obtain the power consumption data related to various devices including the electronic device 200 periodically and may share the data as and when required by the electronic device 200.

Further, the electronic device 200 may include a processor 209. The processor 209 may perform necessary functions of the electronic device 200 based on instructions stored in the memory 207. In an embodiment, the detecting unit 201, the selection unit 202, the control unit 203, the monitoring unit 204, and the analysis unit 205 may be implemented external to the processor 209, as illustrated in the figure. In an embodiment, the detecting unit 201, the selection unit 202, the control unit 203, the monitoring unit 204, and the analysis unit 205 may be internal to the processor 209. In an embodiment, a single unit may perform functions of any combination of the units from the functionalities of the detecting unit 201, the selection unit 202, the control unit 203, the monitoring unit 204, and the analysis unit 205. In an embodiment, the detecting unit 201, the selection unit 202, the control unit 203, the monitoring unit 204, and the analysis unit 205 may be implemented as a software module such as a mobile-based application. The application may be pre-loaded or may be downloaded onto the electronic device 200. In an embodiment, the detecting unit 201, the selection unit 202, the control unit 203, the monitoring unit 204, and the analysis unit 205 may be implemented as a module that is a combination of software and hardware modules.

Although specific units/modules have been illustrated in FIG. 2 and described above, it should be understood that the electronic device 200 may include other hardware modules, software module, or combinations of hardware modules with software modules as may be required for performing various functions.

FIGS. 3A and 3B illustrate a first example 300 for power management in an electronic device 301, in accordance with the present disclosure. The electronic device 301 includes units as described with reference to FIG. 2. Referring to FIG. 3A, the current time 302 is displayed on the electronic device 301 as 12:30 hours. A user of the electronic device 301 dials a telephone number of an at least one further electronic device by using a method known in the art. Accordingly, a real-time event is detected on the electronic device 301. While initiating the call, the electronic device 301 fetches power consumption data associated with a further electronic device corresponding to the dialed number and obtains the power consumption category which is currently being selected for the time segment "12:00-14:00 hours" on the further electronic device. Based on the power consumption category thus obtained, one or more actions are performed on the electronic device. In an example, if the obtained power consumption category is either one of 'M' or 'H', the calling process proceeds according to methods known in the art. However, if the obtained power consumption category is either one of 'VL' or 'L', a notification is generated on the electronic device 301.

Referring to FIG. 3B, 'VL' is obtained as the power consumption category which is currently being selected for the time segment on the further electronic device. Accordingly, a notification 303 indicating "Recipient is in critical battery zone" is generated on the display unit 208 of the electronic device 301. The notification 303 may contain an option 304 for receiving a denial from the user to proceed with the calling process, in which case, the process of calling may be terminated. The notification 303 may also contain an option 305 for receiving permission from the user to proceed with the process of switching to message.

FIGS. 4A, 4B, and 4C illustrate a second example 400 for power management in an electronic device 401, in accordance with the present disclosure. The electronic device 401 includes units as described with reference to FIG. 2. Referring to FIG. 4A, the current time 402 is displayed on the electronic device 401 as 08:30 hours. The power consumption data associated with the electronic device 401 is as indicated with reference to Table 2 described above. The power consumption category for the time segment "08:00-10:00 hours" is selected as 'L' based on the power consumption data. Accordingly, the optimal power saving mode is activated on the electronic device 401. Further, current available power is determined based on a current power consumption rate. In an example, the current available power is determined as '82%'.

Based on the monitoring by the monitoring unit 204, the electronic device 401 determines an action to be performed at a further time segment of the time period based on the event information scheduled in a calendar present on the electronic device 401. The power consumption category for the further time segment is obtained based on the power consumption data. Accordingly, FIG. 4B illustrates event information "videography" 403 scheduled at "12:30" 404 in the calendar 405 present on the electronic device 401. The further time segment is, therefore, taken as "12:00-14:00 hours". The power consumption category for the further time segment is obtained as 'H'. In other words, the power required for performing the action is determined as high. More specifically, the required available power for the time 12:30 hours is determined as between "70-100%."

The electronic device 401 may further determine an available power for the further time segment of the time period based on the current available power and the power consumption data. Accordingly, on the basis of current available power, i.e., 82%, and the power consumption category of time segments "08:00-10:00", and "10:00-12:00", i.e., L and M respectively, the available power for the time "12:30" is determined as 75%. (If the action is determined to be performed at "14:00-16:00", then the power consumption category of time segment "12:00-14:00" would also be taken into consideration.) Since, the determined available power is more than or equal to the required available power for the time "12:30", the notification is not generated on the display unit of the electronic device 401.

It is considered that at 09:00, the current available power is determined as 70% by the electronic device 401. Accordingly, on the basis of current available power, i.e., 70%, and the power consumption category of time segments "08:00-10:00", and "10:00-12:00", i.e., L and M respectively, the available power for the time "12:30" is determined as 71%. Since the determined available power is greater than or equal to the required available power for the time "12:30", the notification is not generated on the display unit 208 of the electronic device 401.

However, at 09:30, the current available power is determined as 55% by the electronic device 401. The available power for the time "12:30" is determined as 55%. Since the determined available power is now less than the required available power for the time "12:3", the notification is generated on the electronic device 401. FIG. 4C illustrates the notification 406 "You have videography scheduled at 12:30. System has predicted heavy use until then. Connect charger or tap here to enable power saving mode" generated on the display unit 208 of electronic device 401. The notification 406 may also contain an option 407 for receiving permission from the user to proceed with the process of enabling power saving mode.

FIG. 5 illustrates a third example 500 for power management in an electronic device 501, in accordance with the present disclosure. The electronic device 501 is further communicatively coupled with two further electronic devices 502 and 503. The electronic device 501 and the further electronic devices 502 and 503 include units as described in reference to FIG. 2. Based on the monitoring performed by the monitoring unit, the electronic device 501 may determine an action to be performed at a further time segment of the time period. As explained with reference to FIGS. 4A to 4C, the action "videography" is scheduled at time "12:30" on the electronic device 501. Further, the power consumption category for the time 12:30 is obtained as 'H' (hereinafter referred to as required category).

However, at time 12:30, it is determined that the current available power, i.e., 40%, is less than the required available power for performing the action. The control unit 203 identifies the further electronic device 502 for performing the action, i.e., videography. In other words, the control unit 203 identifies the further electronic device 502 having a 'camera' for performing videography. Upon identification of the further electronic device 502 for performing the action, power consumption data associated with the further electronic device 502 is fetched. A power consumption category (hereinafter referred to as a selected category) that is currently being selected for the time "12:30" is obtained based on the fetched power consumption data associated with the further electronic device 502. The control unit 203 then compares the required category with the selected category. If the required category is less than the selected category, the electronic device 501 scans for further electronic devices (other than the further electronic devices 502 and 503). However, if the required category is greater than or equal to the selected category, an application is invoked on the further electronic device 502. Accordingly, a camera application is either directly invoked at the further electronic device 502 or an alert is provided on the further electronic device 502 by blinking the camera application (represented by a dashed square).

FIG. 6 illustrates a hardware configuration of the electronic device 200. The hardware configuration may be a computer system 600. The computer system 600 may include a set of instructions that, when executed, may cause the computer system 600 to perform any one or more of the disclosed methods. The computer system 600 may operate as a standalone device or may be connected, e.g., using a network, to other computer systems or peripheral devices.

In a network environment, the computer system 600 may operate as a server or as a client computer in a server-client network environment or master-slave network environment, or as a peer computer system in a peer-to-peer (or distributed) network environment. The computer system 600 may be implemented as or incorporated into various devices, such as a personal computer (PC), a tablet PC, a set-top box (STB), a personal digital assistant (PDA), a mobile device, a palmtop computer, a laptop computer, a desktop computer, or any other machine capable of executing a set of instructions (sequential or otherwise) that specify actions to be taken by that machine. Further, while the computer system 600 is illustrated as a single system, the term "device" may be construed to include any collection of systems or subsystems that individually or jointly execute a set, or multiple sets, of instructions to perform one or more computer functions.

The computer system 600 may include a processor 601, e.g., a central processing unit (CPU), a graphics processing unit (GPU), or both. The processor 601 may be the same as the processor 209. The processor 601 may be a component in a variety of systems. For example, the processor 601 may be part of a standard personal computer or a workstation. The processor 601 may include one or more general processors, digital signal processors, application specific integrated circuits, field programmable gate arrays, servers, networks, digital circuits, analog circuits, combinations thereof, or other now known or later developed devices for analysing and processing data The processor 601 may execute a software program, such as a code generated manually (i.e., programmed).

The computer system 600 may include a memory 602, such as the memory 207, which may communicate via a bus 603. The memory 602 may be a main memory, a static memory, or a dynamic memory. The memory 602 may include, but is not limited to, computer-readable storage media such as various types of volatile and non-volatile storage media, including but not limited to, random access memory, read-only memory, programmable read-only memory, electrically programmable read-only memory, electrically erasable read-only memory, flash memory, magnetic tape or disk, optical media and the like. In an example, the memory 602 includes a cache or random access memory for the processor 601. In another example, the memory 602 is separate from the processor 601, such as a cache memory of a processor, the system memory, or other memory. The memory 602 may be an external storage device or a database for storing data. Examples of memory 602 include a hard drive, compact disc ("CD"), digital video disc ("DVD"), memory card, memory stick, floppy disc, universal serial bus ("USB") memory device, or any other device operative capable of storing data. The memory 602 may be operable to store instructions executable by the processor 601. The functions, acts, or tasks illustrated in the figures or described may be performed by the programmed processor 601 by executing the instructions stored in the memory 602. The functions, acts, or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The computer system 600 may further include a display unit 604, such as a liquid crystal display (LCD), an organic light emitting diode (OLED), a flat panel display, a solid state display, a cathode ray tube (CRT), a projector, a printer or other now known or later developed display device for outputting determined information. The display unit 604 may act as an interface that allows the user to observe the functioning of the processor 601, or specifically as an interface with the software stored in the memory 602 or in a drive unit 606.

The computer system 600 may also include a disk or optical drive unit 606. The disk drive unit 606 may include a computer-readable medium 607 in which one or more sets of instructions 608, e.g. software, may be embedded. Further, the instructions 608 may embody one or more of the methods or logic as described. In an example, the instructions 608 may reside completely, or at least partially, within the memory 602 or within the processor 601 during execution by the computer system 600. The processor 601 and the memory 602 may also include computer-readable media as discussed above.

The present disclosure may also include a computer-readable medium that may store instructions 608 or receive and execute instructions 608 responsive to a propagated signal so that a device connected to a network 609 may communicate voice, video, audio, images or any other data over the network 609. Further, the instructions 608 may be transmitted or received over the network 609 via a communication port or interface 610 or using the bus 603. The communication port or interface 610 may be a part of the processor 601 or may be a separate component. The communication port 610 may be software or a hardware connection. The communication port 610 may be configured to be connected with the network 609, external media, the display 604, or any other components in computer system 600, or combinations thereof. The connection with the network 609 may be a physical connection, such as a wired Ethernet connection or may be established wirelessly as discussed later. Likewise, the additional connections with other components of the computer system 600 may be physical connections or may be established wirelessly. The network 609 may alternatively be directly connected to the bus 603.

The network 609 may include wired networks, wireless networks, Ethernet AVB networks, or combinations thereof. The wireless network may be a cellular telephone network, an 802.11, 802.16, 802.20, 802.1Q or Wi-Max network, and cloud-based network. Further, the network 609 may be a public network, such as the Internet, a private network, such as an intranet, home network, an Internet of Things (IoT) network, or combinations thereof, and may utilize a variety of networking protocols now available or later developed including, but not limited to, TCP/IP based networking protocols.

Additionally, the computer system 600 may include an input device 605 configured to allow a user to interact with any of the components of computer system 600. The input device 605 may be a number pad, a keyboard, or a cursor control device such as a mouse, or a joystick, a touch screen display, a remote control, or any other device capable of interacting with the computer system 600.

In another example, dedicated hardware implementations, such as application specific integrated circuits, programmable logic arrays, and other hardware devices, may be used to implement various parts of the computer system 600. Applications that may use a computer system may broadly include a variety of electronic devices and computer systems. In one or more examples described above, functions may be implemented using two or more specific interconnected hardware modules or devices with related control and data signals that may be transmitted between and through the modules, or as portions of an application-specific integrated circuit. Accordingly, the present system encompasses software, firmware, and hardware implementations.

The system described may be implemented as a software program executable by a computer system. Further, in a non-limited example, implementations may include distributed processing, component/object distributed processing, and parallel processing. Alternatively, virtual computer system processing may be used to implement various parts of the system.

The system is not limited to operations according to any particular standards and protocols. For example, Internet standards and other standards for packet switched network transmission (e.g., TCP/IP, UDP/IP, HTML, HTTP) may be used. These standards may be periodically superseded by faster or more efficient equivalents having essentially the same functions. Accordingly, replacement standards and protocols having the same or similar functions as those disclosed are considered equivalents thereof. It may be noted that the method described in the present disclosure may be implemented in a wide variety of electronic devices including but not limited to desktop computers, laptop computers, palmtop computers, tabs, mobile phones, televisions, etc. Also, the user input may be received by the system according to a wide variety of techniques including but not limited to use of a mouse, a gesture input, a touch input, a stylus input, a joystick input, a pointer input, etc.

While certain embodiments of the disclosure have been illustrated and described herein, it is to be understood that the disclosure is not limited thereto. The disclosure may be variously embodied and practiced within the scope of the following claims.

The invention claimed is:

1. A method for power management of a device, the method comprising:
    determining an onset of a predefined time segment corresponding to a time period;
    obtaining power consumption data by monitoring at least one of a current power consumption rate, a current device state, and a current device usage pattern of the device during the predefined time segment;
    selecting a power consumption category for the predefined time segment based on the power consumption data;
    switching from a first power saving mode active on the device to a second power saving mode based on the selected power consumption category; and
    performing one or more operations of controlling a reception of a notification from one or more other devices communicatively coupled with the device, or controlling an activation of one or more sensors associated with the device, on the device based on the second power saving mode.

2. The method of claim 1, wherein the determining the onset of the predefined time segment comprises:
    determining the onset of the predefined time segment corresponding to the time period based on a current time.

3. The method of claim 1, wherein the switching from the first power saving mode active on the device to the second power saving mode further based on a current screen-state of the device.

4. The method of claim 1, wherein the time period is at least one of a year, a half of a year, a quarter of a year, a month, a week, and a day and the predefined time segment is adjusted based on the time period.

5. The method of claim 1, wherein the one or more operations further comprises at least one of:
    controlling a screen brightness of the device by a predefined value;
    controlling a duration for switching to screen-off state by a predefined value;
    clearing at least a portion of a memory of the device;
    terminating one or more background applications; and
    controlling network access for one or more applications.

6. The method of claim 1, wherein the current power consumption rate corresponds to a rate of battery percentage drop, the current device state corresponds to at least one of a power-on-state, a power-off-state, a screen-on-state, a screen-off-state, a charging state, and a discharging state of the device, and the device usage pattern corresponds to usage information of the device collected based on at least one of a user action and a user preference.

7. The method of claim 1, further comprising:
    performing a set of actions on the device based on the monitoring.

8. The method of claim 7, wherein the set of actions comprises:
    detecting current available power based on the current power consumption rate;
    detecting available power for a next time segment of the time period based on the current available power; and
    generating a notification indicative of the detected available power on the device.

9. The method of claim 7, wherein the set of actions comprises:

detecting a current power consumption category for the predefined time segment based on at least one of the current power consumption rate, the current device state, and the current device usage pattern of the device monitored upon an expiration of the predefined time segment;

deriving a second power consumption category for the predefined time segment of a next time period based on the current power consumption category;

updating power consumption data with the second power consumption category; and sharing the updated power consumption data with a second device.

10. The method of claim 7, wherein the set of actions comprises:

determining an action to be performed on the device at a next time segment of the time period;

obtaining a second power consumption category for the next time segment based on the power consumption data;

generating a notification on the device based on at least one of the action, the second power consumption category, and a current available power of the device.

11. The method of claim 10, wherein the set of actions further comprises:

identifying a second device for performing the action;

comparing the second power consumption category for the next time segment and a third power consumption category of the second device for the next time segment; and performing one or more additional operations based on the comparison.

12. The method of claim 1, further comprising:

detecting a real-time event on the device;

selecting a second power consumption category for the time segment on a second device based on power consumption data associated with the second device;

performing one or more additional operations based on the second power consumption category and the power consumption category.

13. The method of claim 12, wherein the real-time event comprises at least one of a user input of initiating a communication with the second device, a user input of sharing one or more data with the second device, and an incoming call from the second device.

14. The method of claim 1, further comprising:

obtaining a power consumption mapping data by mapping a plurality of the selected power consumption categories to a plurality of time segments for the time period.

15. An apparatus for power management, the apparatus comprising:

a display;

a detecting unit configured to monitor at least one of a current power consumption rate, a current device state, and a current device usage pattern of the apparatus during a predefined time segment; and at least one processor configured to:
determine an onset of the predefined time segment corresponding to a time period,
obtain power consumption data by monitoring performed by the detecting unit,
select a power consumption category for the predefined time segment based on the power consumption data,
switch from a first power saving mode to a second power saving mode based on the selected power consumption category, and
perform one or more operations of controlling a reception of a notification from one or more other devices communicatively coupled with the device, or controlling an activation of one or more sensors associated with the device, on the device based on the second power saving mode.

* * * * *